(12) United States Patent
Je (10) Patent No.: US 8,544,326 B2
(45) Date of Patent: Oct. 1, 2013

(54) VERTICAL ACCELEROMETER

(75) Inventor: Chang Han Je, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 628 days.

(21) Appl. No.: 12/783,789

(22) Filed: May 20, 2010

(65) Prior Publication Data

US 2011/0138913 A1   Jun. 16, 2011

(30) Foreign Application Priority Data

Dec. 14, 2009  (KR) .................. 10-2009-0123750

(51) Int. Cl.
  *G01P 15/125*  (2006.01)
(52) U.S. Cl.
  USPC ........................................ 73/514.32
(58) Field of Classification Search
  USPC ............... 73/514.32, 514.36, 514.37
  See application file for complete search history.

(56) References Cited

U.S. PATENT DOCUMENTS

| | | | |
|---|---|---|---|
| 5,350,189 A * | 9/1994 | Tsuchitani et al. ............ 280/735 |
| 5,417,312 A * | 5/1995 | Tsuchitani et al. ........ 188/181 A |
| 5,905,203 A * | 5/1999 | Flach et al. ................. 73/514.32 |
| 5,986,497 A * | 11/1999 | Tsugai ............................ 327/554 |
| 6,595,055 B1 * | 7/2003 | Schenk et al. ............. 73/514.15 |
| 6,912,902 B2 * | 7/2005 | Malametz et al. ......... 73/514.32 |
| 8,171,793 B2 * | 5/2012 | Foster .......................... 73/514.32 |
| 8,220,330 B2 * | 7/2012 | Miller et al. ................ 73/514.32 |
| 2005/0092086 A1 * | 5/2005 | Chen et al. .................. 73/514.32 |
| 2005/0268719 A1 * | 12/2005 | Malametz .................... 73/514.32 |
| 2006/0169041 A1 * | 8/2006 | Madni et al. ................. 73/504.02 |
| 2007/0000323 A1 * | 1/2007 | Kuisma ........................ 73/514.32 |
| 2008/0053229 A1 * | 3/2008 | Gogoi et al. ................. 73/514.32 |
| 2008/0110260 A1 * | 5/2008 | Konno et al. ............... 73/514.32 |
| 2009/0064785 A1 * | 3/2009 | Fukuda et al. .............. 73/514.32 |
| 2010/0095768 A1 * | 4/2010 | Acar et al. .................. 73/504.04 |
| 2011/0138913 A1 * | 6/2011 | Je ................................ 73/514.32 |

FOREIGN PATENT DOCUMENTS

| | | |
|---|---|---|
| JP | 2008-139282 A | 6/2008 |
| KR | 1020000046474 A | 7/2000 |
| KR | 100464297 B1 | 12/2004 |
| KR | 1020050062292 A | 6/2005 |
| KR | 1020050121223 A | 12/2005 |
| KR | 1020080073195 A | 8/2008 |

OTHER PUBLICATIONS

Hongwei Qu et al., "A Single-Crystal Silicon 3-axis CMOS-MEMS Accelerometer," IEEE, 2004, pp. 661-664, IEEE.
Arjun Selvakumar et al., "A High-Sensitivity Z-Axis Capacitive Silicon Microaccelerometer with a Torsional Suspension," Journal of Microelectromechanical Systems, Jun. 1998, pp. 192-200, vol. 7 No. 2, IEEE.

* cited by examiner

*Primary Examiner* — Hezron E Williams
*Assistant Examiner* — Mark A Shabman

(57) ABSTRACT

Provided is a vertical accelerometer for measuring acceleration applied perpendicular to a substrate to increase sensitivity thereof. The vertical accelerometer includes a substrate, and a plurality of unit vertical accelerometers, each having a detection mass disposed on the substrate to be rotated by acceleration applied perpendicular to the substrate, and a detection electrode formed at the detection mass. Here, the unit vertical accelerometers are provided to be in contact with the detection electrodes to detect the acceleration through variation in capacitance due to variation in area in which the contacted detection electrodes overlaps each other.

8 Claims, 7 Drawing Sheets

VERTICAL ACCELEROMETER

CROSS-REFERENCE TO RELATED APPLICATION

This application claims priority to and the benefit of Korean Patent Application No. 10-2009-0123750, filed Dec. 14, 2009, the disclosure of which is incorporated herein by reference in its entirety.

BACKGROUND

1. Field of the Invention

The present invention relates to a capacitive accelerometer, and more particularly, to an ultra-small capacitive accelerometer capable of detecting variation in capacitance between a reference electrode and a detection electrode by varying an area overlapping therebetween through a circuit to measure acceleration.

2. Discussion of Related Art

Ultra-small accelerometers are widely used in various fields such as automobile industries, defense industries, robot systems, safety diagnosis, and so on, due to their compact structure, low price, high performance, etc. Among these accelerometers, a capacitive accelerometer is a sensor for detecting variation in capacitance between a reference electrode and a detection electrode by acceleration generated by a force applied from the exterior to determine acceleration of a moving object.

The capacitance is determined by the following Formula 1. As a distance d between the electrodes becomes smaller and an overlapping area increases, the capacitance also increases.

$$C = \varepsilon \frac{A}{d} \quad \text{[Formula 1]}$$

In addition, since variation in capacitance increases as variation in overlapping area increases, it is possible to manufacture a sensitive accelerometer. Therefore, when an ultra-small capacitive accelerometer is manufactured, it is important to increase variation in overlapping area.

Figure 1A:
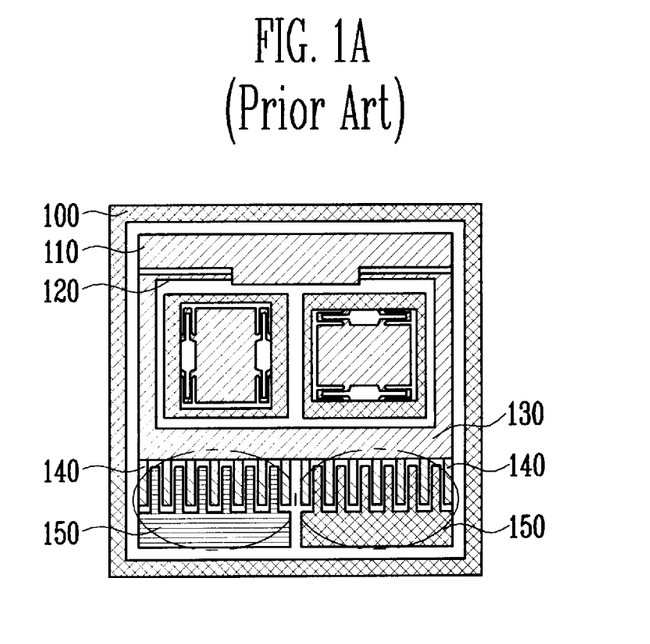
FIGS. 1A and 1B are views of conventional vertical accelerometers.

FIG. 1A shows a conventional z-axis capacitive accelerometer having a cantilever beam connected to a support via a torsion part.

The accelerometer includes a substrate 100, detection masses 130 disposed at predetermined intervals and fixed to the substrate 100 by a support 110, and a torsion part 120 connecting the detection masses 130 to the support 110 and twisted by z-axial acceleration. Comb-shaped detection electrodes 140 are formed at ends of the masses, and reference electrodes 150 (150) overlapping the electrodes 140 are fixed to the substrate 100.

When an acceleration movement is performed by an external force in a direction perpendicular to the substrate 100, the detection mass 130 moves in a direction opposite to the acceleration direction as a support spring 120 is twisted, and thus, an area in which the detection electrodes 140 overlap the reference electrodes 150 varies. Therefore, capacitance between the electrodes varies so that the magnitude of acceleration can be detected therethrough. However, since the accelerometer moves only the detection mass with respect to the acceleration, variation in detection area is relatively small, and the accelerometer may be readily affected by the acceleration of the other axis.

Figure 1B:
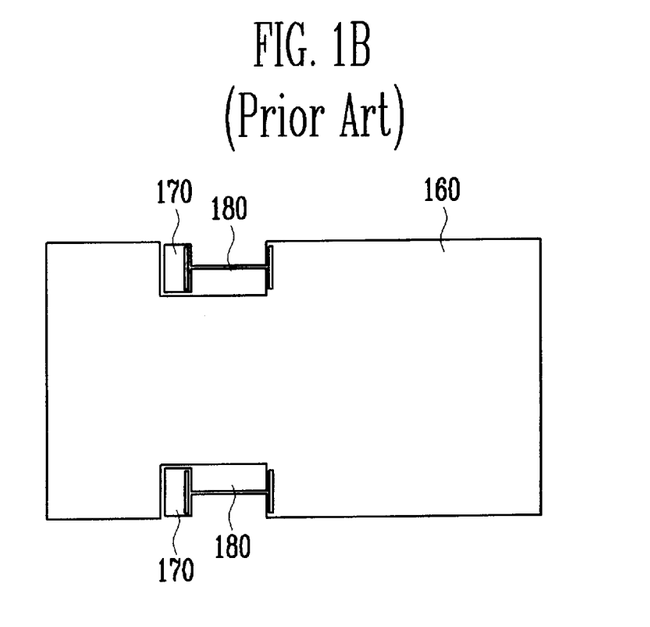

FIG. 1B illustrates an example of a z-axis capacitive accelerometer of a seesaw structure having a detection mass disposed in a symmetrical manner with respect to a bending beam.

In FIG. 1B, a detection mass 160 is spaced apart from the substrate 100 by a bending beam 180 connected to a support 170 fixed to the substrate 100, and the mass is disposed in an asymmetrical manner with respect to the bending beam 180. A detection electrode is formed at both ends of the detection mass 160, and a reference electrode overlapping the detection electrode is fixed to the substrate 100.

In the accelerometer, when vertical acceleration is applied to the substrate, a heavy part 170 of the mass is raised or lowered due to the asymmetrical mass, and a light part 180 is moved in an opposite direction, representing a seesaw behavior. Here, the area in which the detection electrode overlaps the reference electrode varies so that variation in capacitance can be detected therefrom to detect acceleration. However, in this structure, similarly, the area varies by a displacement in which the asymmetric mass moves vertically. In addition, when a large mass is provided to increase sensitivity, affection of the acceleration of the other axis may be increased.

SUMMARY OF THE INVENTION

The present invention is directed to providing a method and structure capable of increasing sensitivity of a vertical capacitive accelerometer.

According to one aspect of the present invention, a vertical accelerometer includes: a substrate; and a plurality of unit vertical accelerometers, each having a detection mass disposed on the substrate to be rotated by acceleration applied perpendicular to the substrate, and a detection electrode formed at the detection mass. Here, the unit vertical accelerometers are provided to be in contact with the detection electrodes to detect the acceleration through variation in capacitance due to variation in area in which the contacted detection electrodes overlaps each other.

The detection mass may be connected to the substrate by a support spring and may have an asymmetrical weight with respect to the support spring to be rotated about the support spring when vertical acceleration is applied. The detection mass may have a heavy mass and a light mass about the support spring, and the unit vertical accelerometers may be disposed such that the heavy mass of the detection mass opposes the light mass of another detection mass. The detection electrodes may be formed at both ends or side surfaces of the detection mass, and may be formed in pairs to prevent collision thereof and have a predetermined interval and area when the unit vertical accelerometers are disposed in contact with each other. The heavy mass of the detection mass may be rotated in a direction of the acceleration applied perpendicular to the substrate, and the detection electrode may measure variation in area in which the heavy mass of the detection mass overlaps the light mass of another detection mass as variation in capacitance to detect the acceleration. The detection mass may have an asymmetrical weight with respect to the support spring due to selective etching of the mass and deposition of another material, or a difference in area. The support spring may be twisted or bent when the detection mass is vertically rotated by the vertical acceleration. The unit vertical accelerometers may be disposed on the substrate to be engaged with each other to form a closed loop.

According to another aspect of the present invention, a three-dimensional accelerometer includes: a substrate; X- and Y-axis accelerometers disposed on the substrate and detecting acceleration parallel to the substrate; and a plurality of unit vertical accelerometers, each having a detection mass disposed on the substrate to be rotated by acceleration applied perpendicular to the substrate, and a detection electrode formed at the detection mass. Here, the X- and Y-axis accelerometers are disposed at a center of the substrate, and the unit vertical accelerometers are disposed at a periphery of the substrate to detect three-dimensional acceleration.

BRIEF DESCRIPTION OF THE DRAWINGS

The above and other features of the present invention will be described in reference to certain exemplary embodiments thereof with reference to the attached drawings in which.

DETAILED DESCRIPTION OF EXEMPLARY EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification.

Figure 2:
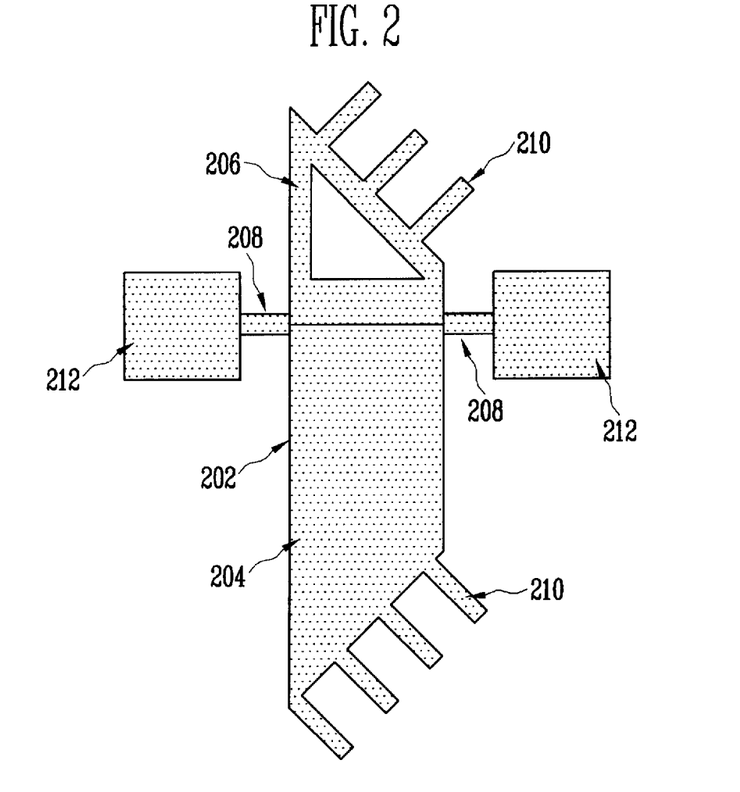
FIG. 2 is a plan view of a unit acceleration detection body in accordance with an exemplary embodiment of the present invention.

FIG. 2 is a plan view of a unit acceleration detection body in accordance with an exemplary embodiment of the present invention.

Referring to FIG. 2, a unit acceleration detection body includes a detection mass 202 disposed on a substrate to be rotated by the acceleration applied to the substrate in a vertical direction, and detection electrodes 210 formed on the detection mass 202.

The detection mass 202 is rotatably disposed and spaced apart from the substrate. The detection mass 202 is constituted by a heavy mass 204 and a light mass 206, which are asymmetrical, and may include support springs 208 and detection electrodes 210. The detection mass 202 may have an asymmetrical mass with respect to the support spring 208 due to selective etching of the mass, deposition of another material, or a difference in area.

The asymmetrical detection mass 202 has two parts, i.e., the heavy mass 204 and the light mass 206 to be rotated with respect to vertical acceleration. The heavy mass 204 and the light mass 206 are disposed at both sides of a spring support 212 and the support spring 208. However, it is not limited to this structure that the support spring 208 supports side surfaces of the detection mass 202, and the detection mass 202 may be formed in various shapes. In addition, at least one of the detection electrodes 210 may be disposed at ends of the heavy mass 204 and the light mass 206, and may have a comb shape as shown in FIG. 2.

Further, two support springs 208 are symmetrically connected to a portion of the detection mass 202 at which the light mass 206 meets the heavy mass 204. As a result, the support springs 208 sensitively react with the vertical acceleration, and insensitively react with acceleration in the other directions. The support spring 208 of FIG. 2 may have a twisted beam shape, or may have a bending beam shape.

The detection electrodes 210 may be disposed at ends of the light mass 206 and the heavy mass 204 of the detection mass 202. The detection electrodes 210 should be provided to form a pair connected to the light mass 206 and the heavy mass 204 so that the detection electrodes can be disposed at predetermined intervals when the unit vertical accelerometers are in contact with each other. For example, as shown in FIG. 2, the pair of comb-shaped detection electrodes are divided into the heavy part and the light part and in contact with each other to maintain a predetermined gap. The detection electrodes 210 may have various shapes depending on forms and dispositions of the structures.

Figure 3:
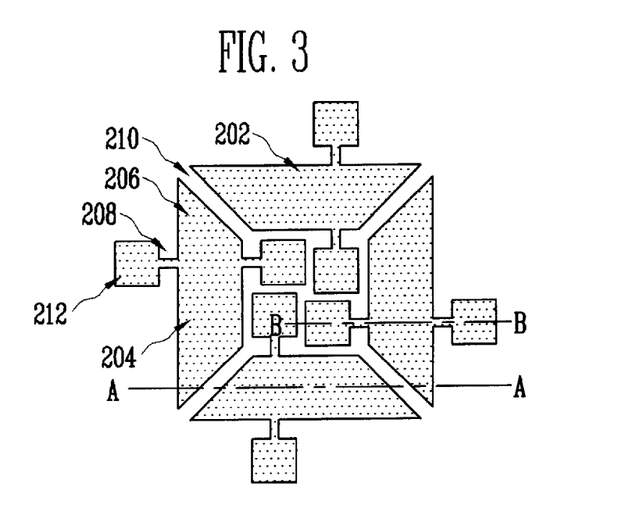
FIG. 3 is a plan view of a vertical accelerometer having the unit acceleration detection body of FIG. 2.

FIG. 3 is a plan view of the vertical accelerometer, in which the unit acceleration detection body of FIG. 2 is disposed on the substrate. A plurality of unit vertical accelerometers are disposed on the substrate 100 at predetermined intervals as shown in FIG. 3 to detect vertical acceleration.

Figure 4A:
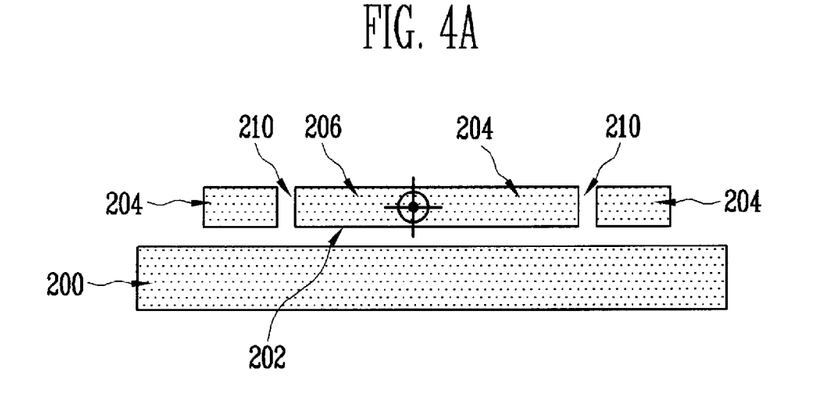
FIGS. 4A and 4B are cross-sectional views taken along lines A-A and B-B of FIG. 3.
Figure 4B:
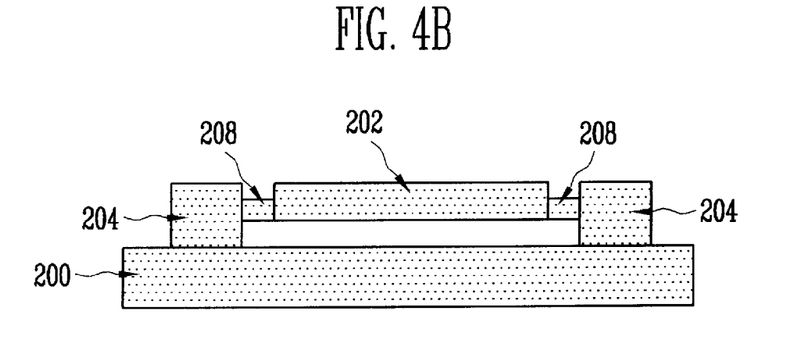

FIGS. 4A and 4B are cross-sectional views taken along lines A-A and B-B of the vertical accelerometer of FIG. 3. The unit vertical accelerometers are disposed on the substrate 200 such that the light mass of the detection mass 202 is opposite to the heavy mass 204 of another detection mass 202 as shown in FIGS. 4A and 4B.

The vertical accelerometer for detecting acceleration vertical to the substrate in accordance with an exemplary embodiment of the present invention uses an asymmetrical displacement structure to increase sensitivity. Specifically, in detecting the acceleration vertical to the substrate, the detection mass 202 constituted by the heavy mass 204 and the light mass 206 is asymmetrically connected to the substrate by the support spring 208 to be rotated about the support spring 208 when vertical acceleration is applied, so that the heavy mass 204 approaches the substrate and the light mass 206 moves away from the substrate. Such characteristics enable measurement of variation in overlapping area between the masses as variation in capacitance to detect the acceleration.

The plurality of unit acceleration detection bodies including the asymmetrical detection masses 202 and the detection electrodes 210, which are attached to the substrate to be vertically rotated by the vertical acceleration, are alternately engaged with each other so that variation in capacitance can be amplified by movement of the engaged part in an opposite direction due to the acceleration to increase the sensitivity. In particular, the detection mass 202 has a weight asymmetrically disposed with respect to the support spring 208 to be rotated about the spring support 212 when the vertical acceleration is applied.

The unit acceleration detection bodies may be disposed to be engaged with each other to form a closed loop. In particular, the detection electrodes are disposed to overlap at predetermined intervals such that the heavy mass and the light mass of the detection mass 202 are in contact with each other. Here, the unit vertical axis detection bodies may include unit vertical axis detection bodies for reading capacitance and unit vertical axis detection bodies functioning as a reference electrode, which are sequentially disposed to be differentially operated.

Figure 5A:
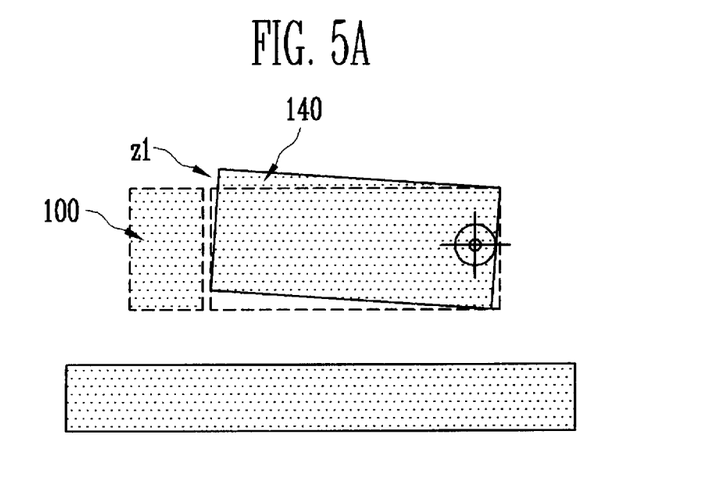
FIGS. 5A and 5B are cross-sectional views for explaining displacement of a conventional accelerometer.
Figure 5B:
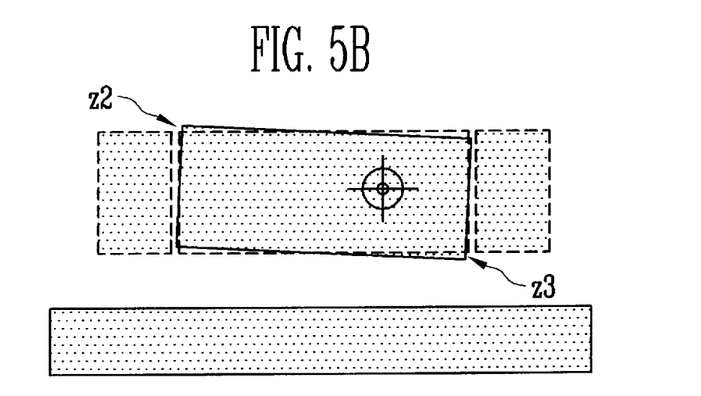
Figure 6:
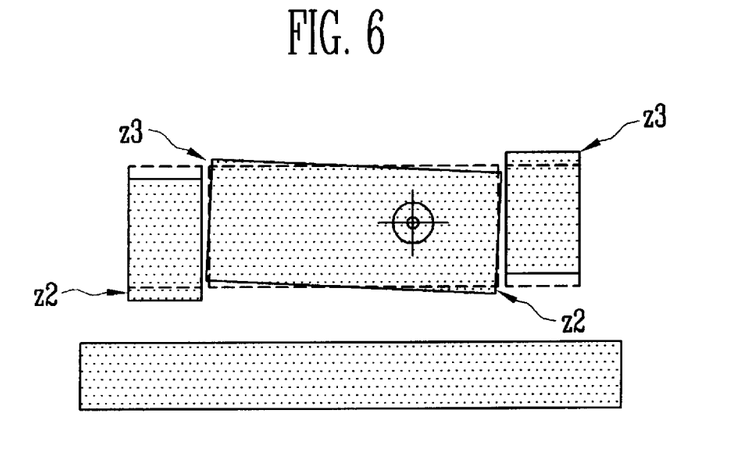
FIG. 6 is a cross-sectional view for explaining asymmetrical displacement in accordance with an exemplary embodiment of the present invention.

In order to specifically describe the theory that the vertical axis direction accelerometer has a higher sensitivity than the conventional art, FIGS. 5A, 5B and 6 are cross-sectional views showing displacement with respect to the vertical acceleration in the conventional art and the present invention.

FIGS. 5A and 5B are conceptual views for explaining an acceleration measurement theory of a conventional vertical accelerometer.

FIG. 5A shows a cross-sectional view of the conventional vertical accelerometer of FIG. 1A. When the vertical acceleration is applied to the substrate, the detection mass is rotated in a direction opposite to the acceleration about a support spring connection part. Here, the reference electrode 150 is fixed to the substrate, and the detection electrode 140 is raised to z1 so that a detection area and a capacitance value vary. The variation in capacitance is in proportion to the displacement z1 of the detection electrode 140.

FIG. 5B shows a cross-sectional view of the conventional vertical accelerometer of FIG. 1B. Similarly, when the vertical acceleration is applied to the substrate, the detection mass is rotated about the support spring connection part, and the displacement occurs to z2 and z3 with respect to the reference electrode fixed to the substrate as shown in FIG. 5B. That is, variation in the entire area corresponds to z2+z3 and the capacitance varies in proportion thereto.

FIG. 6 is a conceptual view for explaining an acceleration measurement theory of the vertical accelerometer in accordance with an exemplary embodiment of the present invention. A technique of the present invention can be described with reference to a cross-sectional view of FIG. 6. Unlike the conventional art, a reference electrode as well as a detection electrode 210 can also be vertically moved. Therefore, when the vertical acceleration is applied to the substrate, the unit vertical accelerometer is rotated about the spring support 212, and the other unit vertical accelerometers in contact with both ends thereof are also rotated about the substrate. As a result, as shown in FIG. 6, the detection electrodes in contact with each other move in opposite directions. Therefore, relative displacement between the detection electrodes is about (z2+z3) and (z2+z3) and variation in the entire area is about 2*(z2+z3). Accordingly, when the detection electrodes 210 have the same area, variation in area of the detection electrodes is two times the area of the detection electrodes with respect to the same acceleration. In addition, since the capacitance is in proportion to the variation in area, it is possible to obtain twice the sensitivity.

Figure 7A:
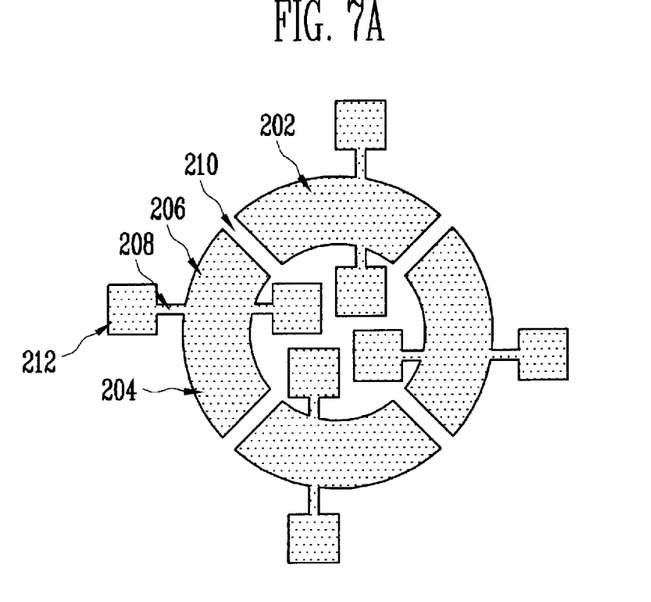
FIGS. 7A and 7B are plan views showing other embodiments of a vertical accelerometer having asymmetrical displacement in accordance with an exemplary embodiment of the present invention.
Figure 7B:
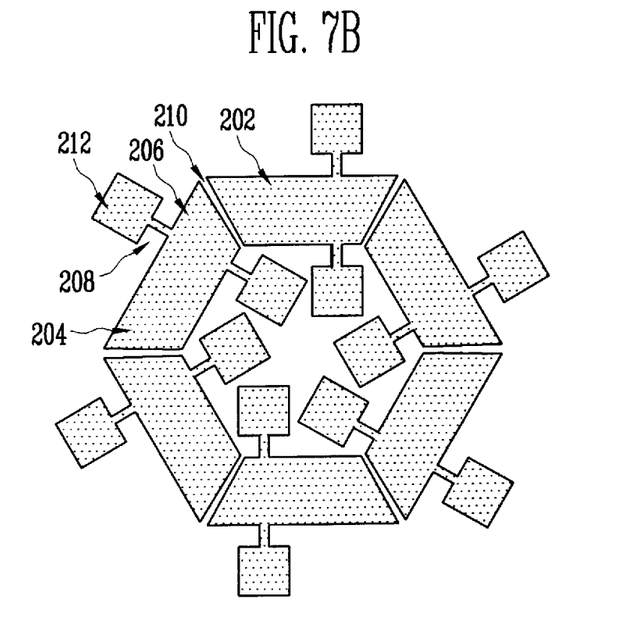

FIGS. 7A and 7B are plan views showing other embodiments of a vertical accelerometer having asymmetrical displacement in accordance with an exemplary embodiment of the present invention. As shown in FIGS. 7A and 7B, the detection mass 202 of the unit vertical accelerometer 202 may have various shapes according to dispositions thereof on the substrate. In addition, the number of the unit vertical accelerometers 202 can also be arbitrarily adjusted. Referring to FIG. 7A, a plurality of detection masses 202 are disposed in a hollow circular shape. Referring to FIG. 7B, a plurality of detection masses 202 are disposed in a hollow polygonal shape.

Figure 8A:
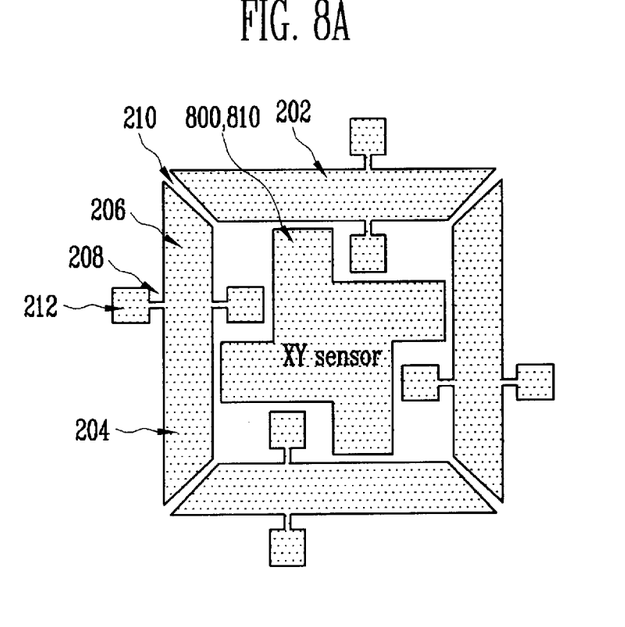
FIGS. 8A and 8B are plan views showing embodiments of a three-dimensional accelerometer including X- and Y-axis accelerometers in accordance with an exemplary embodiment of the present invention.
Figure 8B:
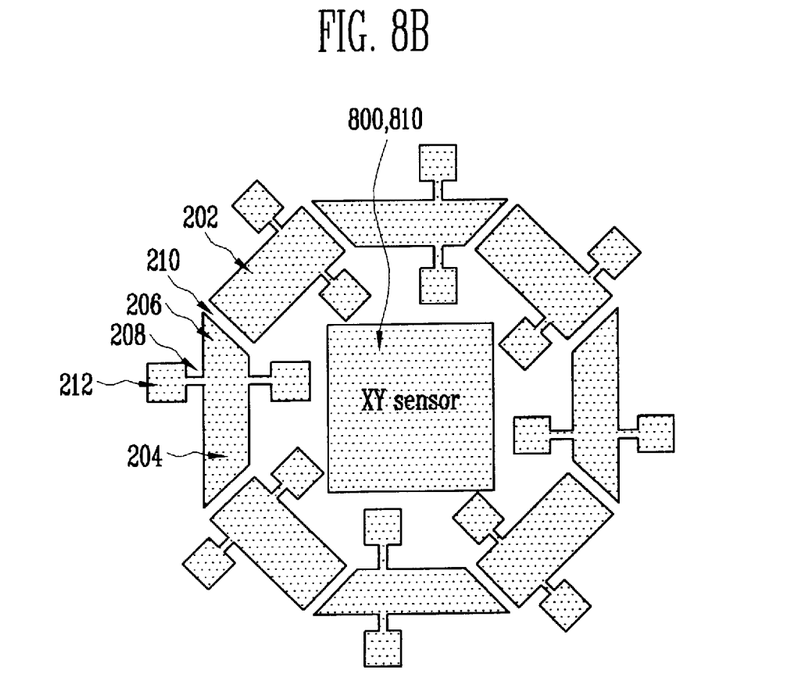

FIGS. 8A and 8B are plan views showing embodiments of a three-dimensional accelerometer including the vertical accelerometer in accordance with an exemplary embodiment of the present invention. The three-dimensional accelerometer includes an X-axis accelerometer 800 and a Y-axis accelerometer 810 disposed at a center of the substrate, and 2n unit vertical accelerometers in accordance with the present invention disposed along an outer periphery of the substrate. The unit vertical accelerometers may be disposed in various shapes and numbers according to the shapes and dispositions of the X- and Y-axis accelerometers to maximally effectively use a space and increase sensitivity thereof.

As described above, the vertical accelerometer in accordance with an exemplary embodiment of the present invention has an advantage of maximizing variation in area of the detection electrodes by moving the reference electrode and the detection electrodes in a direction opposite to the acceleration, increasing sensitivity to twice that of the conventional art, and enabling easy disposition thereof on the substrate using the plurality of unit vertical accelerometers.

As can be seen from the foregoing, a capacitive vertical accelerometer in accordance with an exemplary embodiment of the present invention can increase sensitivity through variation in capacitance with respect to the same acceleration by a reference electrode and a detection electrode moving in opposite directions and readily disposed to increase area efficiency.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A vertical accelerometer comprising:
a substrate;
a plurality of unit vertical accelerometers, each having a detection mass disposed over the substrate capable of being rotated by acceleration applied perpendicular to the substrate; and
a detection electrode formed on the detection mass,
wherein the plurality of unit vertical accelerometers are provided such that a detection electrode of a unit vertical accelerometer opposes a detection electrode of another unit vertical accelerometer to detect the acceleration through a variation in capacitance due to variation in an area in which the detection electrodes opposing each other overlap with each other.

2. The vertical accelerometer of claim 1, wherein the detection mass is connected to the substrate by a support spring has an asymmetrical weight with respect to the support spring, and is capable of being rotated about the support spring when vertical acceleration is applied.

3. The vertical accelerometer of claim 2, wherein the detection mass has a heavy mass and a light mass about the support spring, and the unit vertical accelerometers are disposed such that the heavy mass of the detection mass opposes the light mass of another detection mass.

4. The vertical accelerometer of claim 3, wherein the detection electrodes are formed at both ends or side surfaces of the detection mass, and formed in pairs to prevent collision thereof and have a predetermined interval and area when the unit vertical accelerometers are disposed in contact with each other.

5. The vertical accelerometer of claim 4, wherein when the heavy mass of the detection mass is rotated in a direction of the acceleration applied perpendicular to the substrate, the detection electrode measures the variation in the area in which the heavy mass of the detection mass overlaps with the light mass of another detection mass as variation in capacitance to detect the acceleration.

6. The vertical accelerometer of claim 2, wherein the detection mass has an asymmetrical weight with respect to the support spring due to selective etching of the mass and deposition of another material, or a difference in area.

7. The vertical accelerometer of claim 2, wherein the support spring is twisted or bent when the detection mass is vertically rotated by the vertical acceleration.

8. The vertical accelerometer of claim 1, wherein the unit vertical accelerometers are disposed on the substrate to be engaged with each other to form a closed loop.

* * * * *